Nov. 19, 1968  A. S. TAKACS  3,411,193
TERMINAL LEADS FOR ELECTRICAL DEVICES
Filed Aug. 31, 1965
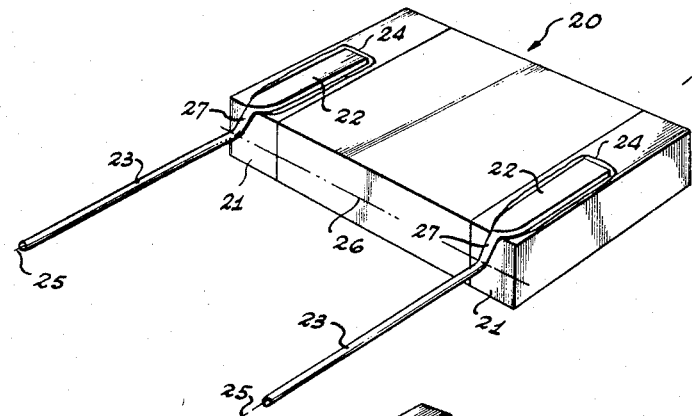
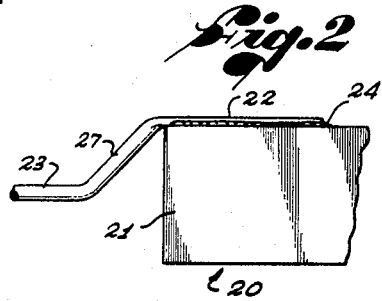
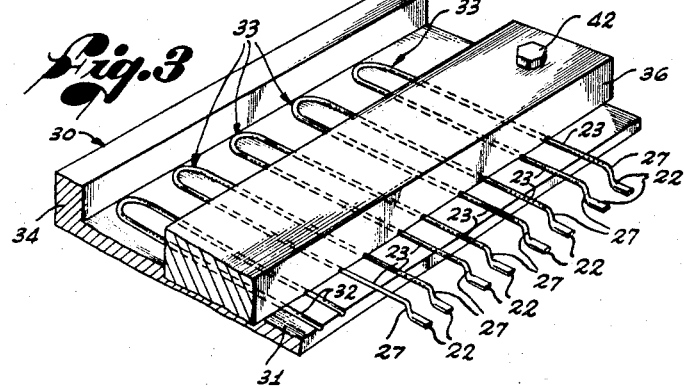
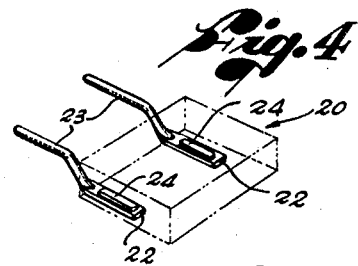
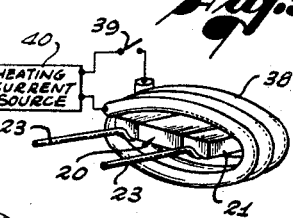
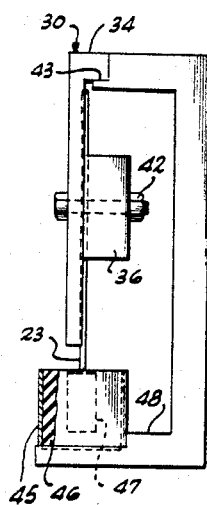
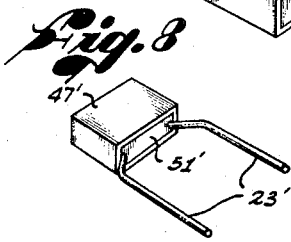
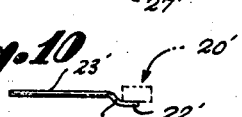
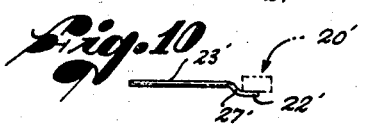
INVENTOR.
ALBERT S. TAKACS
BY Fulwider, Patton, Rieber,
Lee, and Utecht
ATTORNEYS though this material is absent. A still further object of my invention is to provide a method of attaching terminal leads to ceramic capacitor blocks which comprises a minimum number of simple steps, and which avoids objectionable solder connections at the ends of the blocks.

United States Patent Office 3,411,193
Patented Nov. 19, 1968

3,411,193
TERMINAL LEADS FOR ELECTRICAL DEVICES
Albert S. Takacs, Hacienda Heights, Calif., assignor to Marshall Industries, San Marino, Calif., a corporation of California
Filed Aug. 31, 1965, Ser. No. 484,077
3 Claims. (Cl. 29—25.41)

This invention relates to constructions and methods of attaching terminal leads to electrical components, and more particularly to an improved construction and method of attaching terminal leads to external metallic coatings of ceramic capacitors and the like.

A typical ceramic capacitor is an article formed of laminations of rectangular ceramic sheets, each having a metallic coating on one surface thereof. The metal coatings on adjacent sheets extend to opposite ends of the stack, whereby an electrical connection can be made at each end to the coatings on alternate sheets. To this end, it is conventional to apply a metallic electrode coating around each end of the stack to which terminal leads can be soldered or otherwise conductively connected thereto.

A ceramic capacitor as above described is formed as a solid element by sintering. Typically, the metallic coatings are formed of a silver powder which is applied in an appropriate vehicle and caused to bond to the ceramic and to coalesce into a continuous layer during the sintering process.

The constructions, arrangements and methods of attaching leads to such ceramic blocks contribute significantly to the over-all cost of completing the articles. In this connection, it is often desired to arrange that the leads extend from one side of the block, so that the block can be located in a housing or "can," and potted in place with a suitable plastic material.

In one procedure, the leads at one end are separately positioned parallel to and against one end surface of the block, and soldered in place. In another procedure, the leads are arranged longitudinally of and extend from the opposite ends of the block, with their inner ends placed against and soldered to the electrode coatings. In this latter procedure, it is necessary to bend the inner ends of the leads at right angles for them to extend from one side of the block.

In such prior art procedures, the lead connections effectively add to the over-all length of the block. Where space is at a premium, as where it is necessary to pot the capacitor in a housing which is barely large enough to receive the capacitor, soldered connections often are so thick as to extend to the confronting walls of the housing, whereby the potting material cannot adequately encase the entire capacitor structure.

Still further, such prior art procedures result in variations in lengths, positions and spacings of leads extending from the housings of capacitors of a given production run. Ideally, the leads should have the same spacing from capacitor to capacitor, and should extend the same distance from the same points of the different housings. With leads so positioned and arranged, capacitors used as plug-in units can be readily and easily interchanged with a minimum of difficulties. However, in view of the numerous manual operations needed to form leads for such capacitors in prior procedures heretofore known, such uniformity of lead positioning and spacing is not possible.

It is an object of my invention to provide a construction, arrangement and method of attaching terminal leads to electrical components which avoids the above and other disadvantages of the prior art.

It is another object of my invention to provide a new and improved arrangement of and method of attaching terminal leads to ceramic blocks by which to insure volume production of completed articles with uniform spacing and arrangement of terminal leads.

A further object of my invention is to provide an improved construction and arrangement of terminal leads attached to ceramic blocks which eliminates manual positioning of leads.

A still further object of my invention is to provide a method of attaching terminal leads to ceramic capacitor blocks which comprises a minimum number of simple steps, and which avoids objectionable solder connections at the ends of the blocks.

The above and other objects and advantages of my invention will become apparent from the following description taken in conjunction with the accompanying drawings of an illustrative embodiment thereof, in which:

FIGURE 1 is a perspective view of a ceramic capacitor block with terminal leads arranged in accordance with my invention, showing the ends of the leads with flattened, offset portions positioned and soldered on the lower surfaces of the end electrode coatings, and showing how the leads are bent adjacent the block for both providing register points in assembling the blocks on the leads and insuring that the axes of the leads lie in a plane passing through the center of the block;

FIGURE 2 is an enlarged fragmentary end view of the block with one of the leads in place, showing more clearly the configuration of the lead;

FIGURE 3 is a fragmentary view in perspective of a fixture for supporting a plurality of pairs of terminal leads for a number of capacitor blocks in accordance with the method of my invention;

FIGURE 4 is a perspective view of a capacitor block in phantom lines, positioned on the flattened surfaces of the leads, showing conductive bonding material deposited on the upper surfaces of the terminals;

FIGURE 5 is an enlarged, fragmentary end view of the capacitor block of FIGURE 4 during the heating step to cause the ends of the terminal leads to be conductively secured to the end electrode coatings;

FIGURE 6 is an end view of the fixture of FIGURE 3 supported in a frame, with the terminal leads and capacitor blocks soldered thereto extending into individual housings preparatory to potting;

FIGURE 7 is a perspective view of a completed capacitor unit;

FIGURE 8 is a perspective view of a completed capacitor unit of smaller size, wherein the leads extend outwardly from the housing, so as to be spaced the same as for larger capacitor units;

FIGURE 9 is a top plan view of the end portions of the leads for the capacitor of FIGURE 8; and FIGURE 10 is an end view of a capacitor unit mounted on the flattened end surfaces of the leads of FIGURE 9.

Referring to FIGURES 1 and 2, a rectangular block 20 forming a ceramic capacitor is provided with silver electrode coatings 21 around its ends for connection to terminal leads. On the bottom surface of the block 20—seen in FIGURE 1 as the top surface, the block being inverted as shown—the ends 22 of leads 23 are soldered, as at 24, to the electrode coatings 21.

The ends 22 of the leads are flat, and are offset a distance equal to half the thickness of the block 20. Thus, the axes of the leads 23, indicated at 25, lie in a plane parallel to and midway between the top and bottom surfaces of the block 20. The center line of the edge of the block from which the leads 23 extend is indicated at 26.

Further in this connection, there is a sharp bend between the flat ends 22 and the offset portions 27. This feature facilitates the proper positioning of the block on the flat ends 22 preparatory to soldering the ends to the silver areas 21, as will now be described.

Referring to FIGURE 3, I provide a fixture which includes an elongated, L-shaped plate 30, in one surface 31 of which a plurality of U-shaped grooves 32 are formed. The leads 23 are initially formed of U-shaped pieces of wire 33, the ends of the legs of which are flattend, as by crimping, and bent a 27 to form the offset portions immediately adjacent the flattened ends 22.

In assembly, the U-shaped pieces of wire 33 are located in the grooves 32, the rounded ends of which extend to the vertical surface 34 of the L-shaped plate 30. Thus, the rounded ends of the wire elements 33 when laid in the grooves 32 are in touching engagement with a reference surface, thereby insuring that the extremities of the flattened ends 22 of all the wire elements 33 lie in a common plane. To aid in holding the wire elements 33 in the grooves 32, a bar 36 is laid over them.

After positioning the wire elements 33 in the grooves 32 as above described, I then deposit small quantities of solder 24 (see FIGURE 4) on the upper surfaces of the flattened ends 22. Referring to FIGURE 4 along with FIGURE 3, I then place a ceramic capacitor 20 with its silver end coatings 21 resting on the upper surfaces of the flattened ends 22 of each wire element 33. In this connection, the arrangement of the offset portions 27 and the flattened ends 22 facilitates locating the ceramic blocks 20 in the same positions on each pair of terminal leads. As will be seen, owing to the angle between the flattened ends 22 and the offset portions 27, the operator upon placing a ceramic block 20 on the upper surfaces of the flattened ends 22 needs only to move the block back until the lower rear edge comes into abutment with the offset portion 27 at the points where they meet the flattened ends 22.

After positioning ceramic blocks 20 on the pairs of flattened ends 22 of the wire elements 33 as above described, the assemblies are heated to cause the portions of solder 24 to flow and bond the flattened ends 22 to the silver coatings 21. Preferably, and referring to FIGURE 4, this is accomplished by locating the block within a heating coil 38, the ends of which are adapted, as by means of a switch 39, to be connected to a heating current source 40. Upon locating the heating coil 38 around the block 20, and closing the switch 39, sufficient current is supplied to the coil to heat the solder and cause the flattened ends to be bonded to the lower surfaces of the silver coatings 21 at the ends of the block.

After thus assembling and bonding capacitor blocks to the flattened ends of the wire elements 33, the capacitors are lowered into respective containers and potted in place therein. This is done simultaneously for all the lead pairs in the method of my invention. Referring to FIGURE 6, the L-shaped plate 30, with the bar 36 secured thereto as at 42, is vertically oriented with its surface 34 resting on the upper horizontal surface 43 of the upper shelf of a C-shaped frame 44. The frame 44 supports on its lower shelf an elongated container 45 which is filled with a resilient material, such as rubber or plastic, indicated at 46, in which there are spaced openings to receive "cans" or containers 47 in which the ceramic blocks are to be potted in place. In this connection, each container 47 is a hollow housing open at one end, and is positioned in an opening in the material 46 with its open end uppermost. The L-shaped member 30 is positioned on the frame 44 so that the ends of each pair of leads 23 extend into a respective housing 47, and with the ceramic block positioned in the housing 47 in non-touching relation with the walls thereof.

The member 30 and the container 45 are so aligned that the axes of the leads 23 extend in a plane that passes through the center of the housing 47. Alignment of the various parts for this purpose can be facilitated in a number of ways, of course. For example, in FIGURE 4 the frame is provided with a raised portion 48 on its lower shelf against which to seat the container 45, and the upper shelf of the frame 44 is so dimensioned to insure that when the member 30 is placed thereon, the lead pairs 23 (and the ceramic blocks on the ends thereof) are in the proper positions.

After assembling the parts as shown in FIGURE 6, potting material, which may be a suitable plastic material, is poured into the housings 47. When the potting material is cured and hardened, the ceramic blocks, together with the flattened ends and offset portions of the leads 23, are firmly embedded in the housings 47. After the potting material is cured and hardened, the housings 47 are removed from the container 45, as by removing the frame 44 and lowering the container 45 to permit the resilient material 46 to release the housing.

Referring to FIGURES 3 and 7, the rounded ends of the U-shaped elements 33 are removed, as by snipping along a trim line 50 (FIG. 3). The resulting capacitor is shown in FIGURE 7, wherein the leads 23 extend from the longitudinal center line of the housing 47 through the potting material, indicated at 51, in which the ceramic block and offset ends of the leads are embedded.

The above-described construction and method of securing terminal leads to and in a capacitor structure makes it possible to use leads of the same spacing for a wide variety of capacitor sizes. For example, and referring to FIGURES 8–10, leads 23', of the same spacing as leads 23 previously described, are shown extending from a housing 47' in which is embedded a ceramic block 20' which is of a length less than the spacing between the leads 23'. As best seen in FIGURES 9 and 10, the leads 23' are formed with offset portions 27' which are also bent inwardly towards each other. The flattened ends 22' are relatively short, to accommodate the smaller ceramic block 20'.

Similarly, my invention makes possible the use of leads of the same spacing for capacitors wherin the ceramic blocks are of such length that the silver coatings at the ends thereof are spaced apart a distance considerably greater than the desired spacing for the leads. For such capacitors, the offset portions of the leads are made divergent.

Accordingly, it will be seen that my invention facilitates the volume production of capacitors of various sizes with leads of uniform length and spacing. With such uniform length and spacing of leads, despite variations in sizes of capacitors, I facilitate the employment of capacitors as plug-in units. In this connection, prior art techniques of lead assembly militate against the production of any two capacitors with assurance that the lengths or spacings of their leads are the same. Accordingly, since plug-in receptacles for leads have a fixed spacing, it has heretofore been necessary to manipulate and "tailor" one or both leads of a finished capacitor in order to make them fit into the receptacle therefor. With leads formed in accordance wtih my invention, such operations are avoided.

It will be apparent that various modifications can be made in the lead configurations and method shown and described herein without departing from the spirit and scope of my invention. Accordingly, I do not intend that my invention be limited, except as by the appended claims.

I claim:

1. The method of attaching leads to metallic edge coatings of a plurality of ceramic blocks, wherein the edge coatings on each block extend around the edges onto one face of the block, comprising:

forming a plurality of U-shaped wire elements with legs of equal length and spacing;

forming the ends of the legs of said U-shaped elements so they are flat and offset, the flattened ends being spaced apart a distance equal to the distance between the coatings on the one face of a ceramic block;

securing said elements side by side on a fixture having a horizontal surface with the mid-points of the rounded ends of said elements on a line at right angles to the axes of said legs;

placing a portion of conductive bonding material on the upper surface of each flattened end;

placing a respective ceramic block astride the flattened ends of each U-shaped element, with the coatings on the one face thereof seated in the portions of bonding material and in registry with the flattened ends;

heating the flattened ends, bonding material and edge coatings to cause the flattened ends to be conductively bonded to the coatings;

forming a plurality of open-topped housings;

arranging said fixture vertically with said ceramic blocks extending downwardly from the lower ends of said U-shaped elements;

inserting the ceramic blocks into said housings;

and potting said ceramic blocks in place in the respective housings.

2. The method of claim 1, wherein the amount of offset for the flattened ends of the legs of each U-shaped element is such that the axes of the associated legs are in a plane midway between the top and bottom faces of the housing from which they extend.

3. The method of claim 1, further including removing the rounded end portions of said wire elements.

References Cited

UNITED STATES PATENTS

| | | | |
|---|---|---|---|
| 3,080,640 | 3/1963 | Jochems | 29—411 XR |
| 3,091,835 | 6/1963 | Weiss | 29—203 XR |
| 3,221,388 | 7/1965 | Weller et al. | 29—25.42 |
| 3,222,450 | 12/1965 | Lee et al. | 174—50.61 |
| 3,274,467 | 9/1966 | Graf | 317—258 |

JOHN F. CAMPBELL, *Primary Examiner.*

D. C. REILEY, *Assistant Examiner.*